United States Patent
Ritzert et al.

(10) Patent No.: US 10,669,755 B2
(45) Date of Patent: Jun. 2, 2020

(54) MULTIPOINT LOCKS AND ASSOCIATED SYSTEMS AND METHODS

(71) Applicant: Pella Corporation, Pella, IA (US)

(72) Inventors: Joseph A. Ritzert, Pella, IA (US); Marlo G. Van Klompenburg, Pella, IA (US); Todd M. Leathers, Pella, IA (US)

(73) Assignee: PELLA CORPORATION, Pella, IA (US)

( * ) Notice: Subject to any disclaimer, the term of this patent is extended or adjusted under 35 U.S.C. 154(b) by 74 days.

(21) Appl. No.: 15/928,611

(22) Filed: Mar. 22, 2018

(65) Prior Publication Data

US 2019/0292820 A1    Sep. 26, 2019

(51) Int. Cl.
| | |
|---|---|
| *E05C 9/06* | (2006.01) |
| *E05C 9/24* | (2006.01) |
| *E05B 63/14* | (2006.01) |
| *E05B 15/00* | (2006.01) |
| *F16H 19/00* | (2006.01) |
| *F16H 21/44* | (2006.01) |
| *E05C 1/00* | (2006.01) |

(52) U.S. Cl.
CPC .............. *E05C 9/063* (2013.01); *E05B 15/00* (2013.01); *E05B 63/146* (2013.01); *E05C 1/006* (2013.01); *E05C 9/24* (2013.01); *F16H 19/001* (2013.01); *F16H 21/44* (2013.01)

(58) Field of Classification Search
CPC . E05C 9/021; E05C 9/12; E05C 9/041; E05C 9/063; E05C 9/24; E05C 1/006; E05C 9/046; E05B 63/146; E05B 15/00; E05B 59/00; F16H 19/001; F16H 21/44

USPC ..... 292/39, 22, 51, 112, 160, 172, 142, 199; 70/107–111, 190, 191
See application file for complete search history.

(56) References Cited

U.S. PATENT DOCUMENTS

| | | | | |
|---|---|---|---|---|
| 1,035,531 | A * | 8/1912 | Cobb | E05B 63/20 292/39 |
| 4,184,349 | A * | 1/1980 | Zaks | E05B 47/0012 292/39 |
| 4,984,832 | A * | 1/1991 | Canepa | E05C 9/06 292/36 |
| 5,094,483 | A * | 3/1992 | James | E05B 65/0075 109/59 R |
| 5,697,654 | A * | 12/1997 | MacDonald | E05B 17/2007 292/66 |
| 6,247,342 | B1 * | 6/2001 | Lilas | E05C 9/041 292/140 |
| 6,257,030 | B1 | 7/2001 | Davis, III et al. | |
| 6,283,516 | B1 * | 9/2001 | Viney | E05B 15/004 292/160 |

(Continued)

*Primary Examiner* — Lloyd A Gall
(74) *Attorney, Agent, or Firm* — Faegre Drinker Biddle & Reath LLP

(57) ABSTRACT

Various aspects of the present disclosure are directed toward apparatuses, systems, and methods that include a multipoint lock. The multipoint lock may include a horizontally translating lock bolt and at least one vertical translating lock bolt. In addition, the multipoint lock includes a linkage coupled to and configured to translate the horizontally translating lock bolt and the at least one vertical translating lock bolt. Further, the multipoint lock includes a gear mechanism configured to actuate the linkage and to effect translation of the horizontally translating lock bolt and the at least one vertical translating lock bolt.

19 Claims, 9 Drawing Sheets

(56) References Cited

U.S. PATENT DOCUMENTS

| | | | | |
|---|---|---|---|---|
| 6,478,345 | B1* | 11/2002 | Viney | E05C 9/041 |
| | | | | 292/39 |
| 6,705,136 | B2* | 3/2004 | Porter | E05B 47/0002 |
| | | | | 109/59 R |
| 7,748,759 | B2 | 7/2010 | Chen et al. | |
| 8,161,780 | B1 | 4/2012 | Huml | |
| 8,763,836 | B2* | 7/2014 | Becklin | B65D 21/0223 |
| | | | | 220/210 |
| 2004/0066046 | A1* | 4/2004 | Becken | E05B 63/20 |
| | | | | 292/39 |
| 2017/0275922 | A1 | 9/2017 | Zeus et al. | |

\* cited by examiner

MULTIPOINT LOCKS AND ASSOCIATED SYSTEMS AND METHODS

TECHNICAL FIELD

Various aspects of the present disclosure relate to multipoint locks for doors or windows. In some specific examples, various aspects of the present disclosure are directed toward apparatuses, systems, and methods that include a multipoint lock operable by a thumb turn.

BACKGROUND

Multipoint locks may be used with door or window assemblies for a secure locking relationship. The multipoint lock may be used between two separate components such as a hinged panel and a doorjamb; a sliding door and a doorjamb, a pair of hinged panels, or other similar components.

Due to the multiple points of securement that multipoint locks achieve, typical multipoint locks require multiple actuation steps. For example, a user may first actuate a handle of the door assembly to manipulate a latch and then actuate a thumb turn or keyed lock cylinder to actuate the lock or unlock the multipoint lock. In addition to requiring multiple steps, which may facilitate user confusion, actuation of typical multipoint locks may require a higher level of force or torque than single point or other locks mechanisms.

Attempts to reduce the number of actuation mechanisms or steps in a multipoint lock have required a higher level of force or torque for operation as compared to the already higher level of force or torque needed for actuation of a typical multipoint lock. Other attempts may not be user friendly or easy to operate for a variety of reasons. Various aspects of the present disclosure are directed toward overcoming these shortcomings, as well as other additional or alternative advantages.

SUMMARY

Various aspects of the present disclosure are directed toward apparatuses, systems, and methods that include a multipoint lock. The multipoint lock may include a horizontally translating lock bolt and at least one vertical translating lock bolt. In addition, the multipoint lock includes a linkage coupled to and configured to translate the horizontally translating lock bolt and the at least one vertical translating lock bolt. Further, the multipoint lock includes a gear mechanism configured to actuate the linkage and to effect translation of the horizontally translating lock bolt and the at least one vertical translating lock bolt. The multipoint lock also includes an input mechanism configured to transfer rotation of the input mechanism to the gear mechanism in response to a user shifting the input mechanism between an unlocked position and an locked position.

Various aspects of the present disclosure are also directed toward fenestration systems that include a hinged panel and a multipoint lock arranged within the hinged panel. The multipoint lock may include a first translating lock bolt and a second translating lock bolt. In addition, the multipoint lock includes a linkage coupled to and configured to translate the first translating lock bolt and the second translating lock bolt and an elliptical gear mechanism configured to translate rotation of the gear mechanism to the linkage and actuate the first translating lock bolt and the second translating lock bolt. Further, the multipoint lock includes an input mechanism configured to transfer rotation of the input mechanism to the elliptical gear mechanism in response to a user shifting the input mechanism between an unlocked position and an locked position with the elliptical gear mechanism being configured to increase force input by the user to the input mechanism progressively when transitioning from the unlocked position to the locked position.

The present disclosure is also directed toward methods of operating a multipoint lock. The methods may include rotating an input mechanism between an unlocked and an locked position and transferring rotation of the input mechanism to a gear mechanism. The methods may also include actuating a linkage in response to rotating the gear mechanism and translating a horizontally translating lock bolt and at least one vertical translating lock bolt by actuating the linkage.

While multiple, inventive examples are specifically disclosed, various modifications and combinations of features from those examples will become apparent to those skilled in the art from the following detailed description. Accordingly, the disclosed examples are meant to be regarded as illustrative in nature and not restrictive.

DETAILED DESCRIPTION

Various aspects of the present disclosure are directed toward apparatuses, systems, and methods that include a multipoint lock that may be used with a hinge door or window. In various examples, the multipoint locks, as discussed herein, help provide consistent weather performance and include an intuitive operation. In certain instances, the multipoint locks of the present disclosure are driven by a single rotational mechanism. More specifically, the multipoint locks may be driven by a thumb turn. In certain instances, the multipoint locks include a ratio drive mechanism for smooth and low force operation (as compared to other single actuation multipoint locks or traditional multipoint locks) in response to rotation of the thumb turn or input mechanism (e.g., a key turn).

Figure 1:
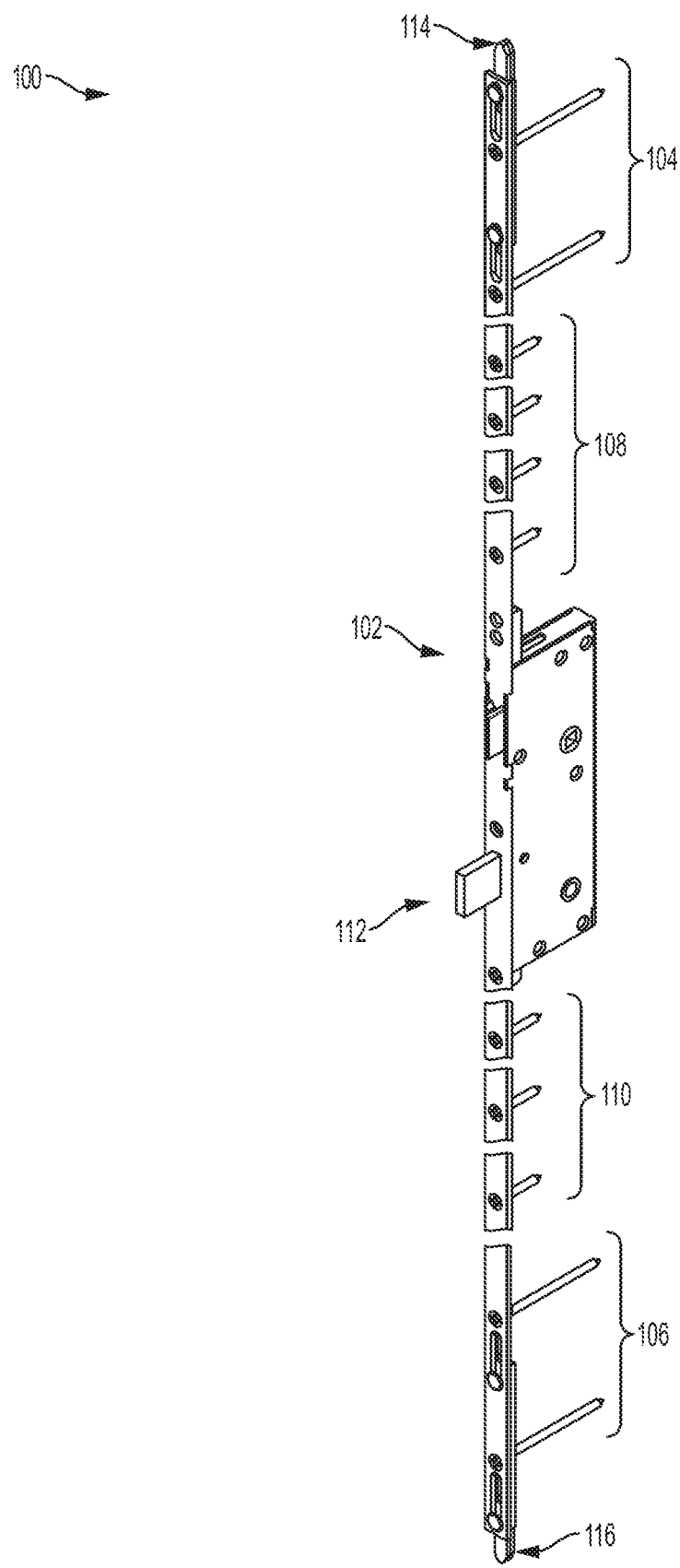
FIG. 1 is an illustration of a multipoint lock assembly, according to some examples.

FIG. 1 is an illustration of a multipoint lock assembly 100, according to some examples. The multipoint lock assembly 100 may be arranged within a door assembly that includes a hinged panel, More specifically, the multipoint lock assembly 100 is coupled or attached to the hinged panel. The multipoint lock assembly 100 may interact with a second door component (such as a door jamb or a stationary door) that includes a strike plate(s) for each of the lock bolts of the multipoint lock assembly 100.

The multipoint lock assembly 100 includes a multipoint lock 102 that is driven by a single rotational mechanism as discussed in further detail below. The multipoint lock assembly 100 may be attached to an edge or perimeter of the hinged panel (not shown) by one or more bolts or attachment mechanisms. As shown in FIG. 1, a first set of attachment mechanisms 104 are arranged above the multipoint lock 102 and a second set of attachment mechanisms 106 are arranged below the multipoint lock 102. In certain instances, the multipoint lock assembly 100 includes additional attachment mechanisms 108, 110 that are also used to attach, connect, or couple the multipoint lock assembly 100 that may be attached to an edge or perimeter of the hinged panel.

In some examples, the multipoint lock 102, driven by way of a single rotational mechanism, includes multiple translating lock bolts 112, 114, 116 controlled by the multipoint lock 102. The multipoint lock 102 optionally includes a horizontally translating lock bolt 112 and two vertically translating bolts 114, 116, The horizontally translating lock bolt 112 and the two vertically translating bolts 114, 116 are shown extended and in a locked position in FIG. 1.

Figure 2A:
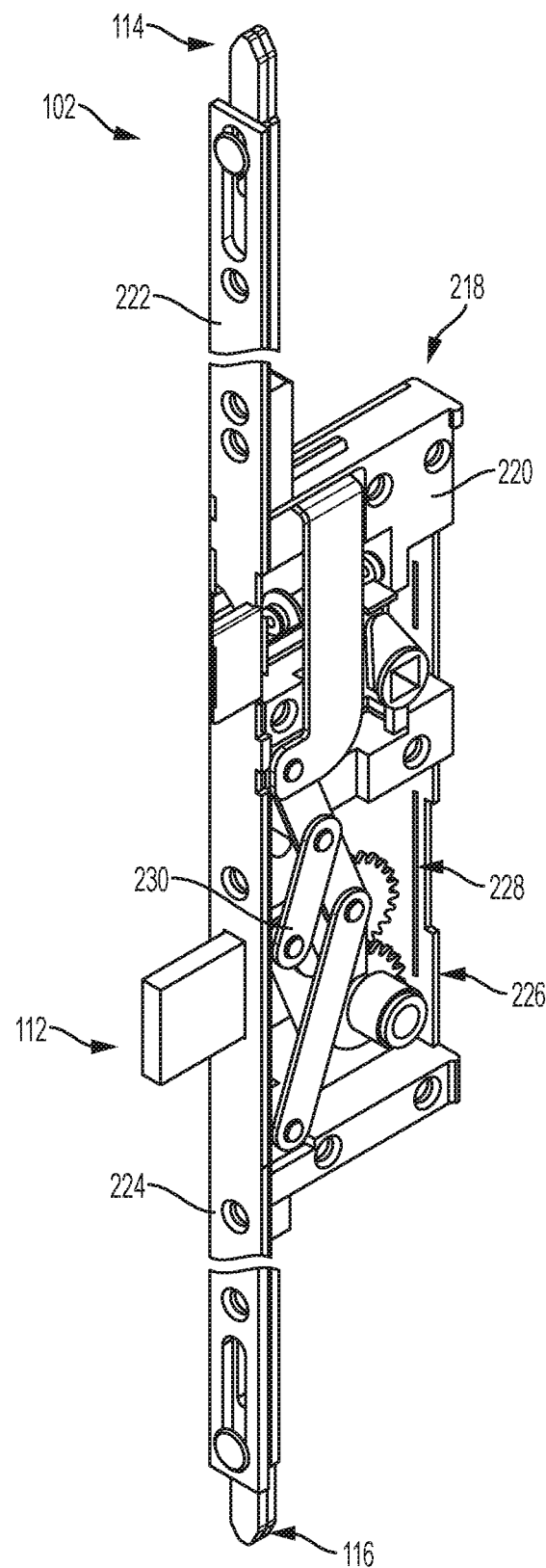
FIG. 2A is a first view of a multipoint lock in a locked position, according to some examples.
Figure 2B:
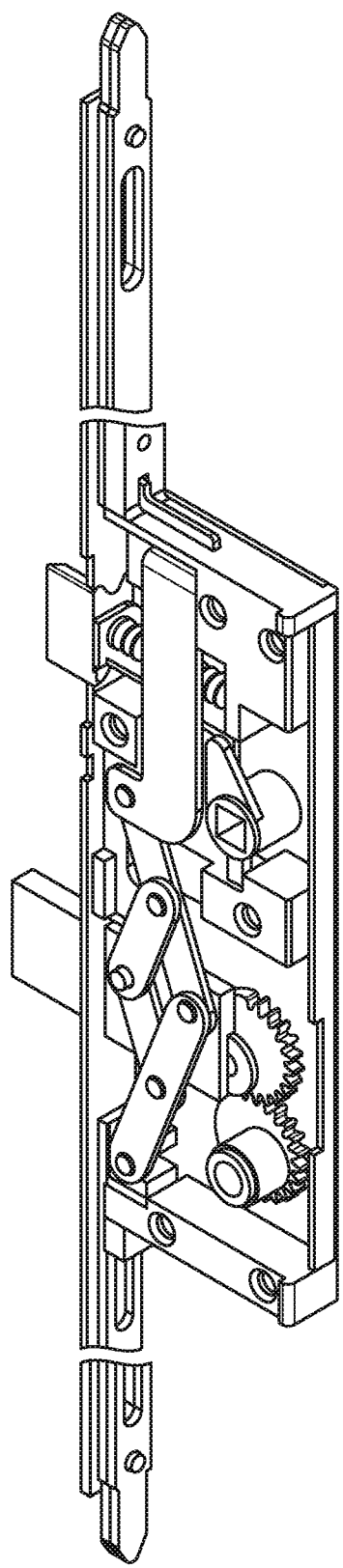
FIG. 2B is a second view of a multipoint lock, shown in FIG. 2A, in a locked position, according to some examples.

FIGS. 2A-B are first and second view of the multipoint lock 102 in a locked position, according to some examples. The multipoint lock 102, driven by way of a single rotational mechanism, includes multiple translating lock bolts 112, 114, 116. As shown, the lock bolts 112, 114, 116 include a horizontally translating lock bolt 112 and two vertically translating bolts 114, 116. The horizontally translating lock bolt 112 and the two vertically translating bolts 114, 116 are shown extended and in a locked position in FIG. 2A.

The multipoint lock 102 includes a housing 218 that encases, houses, or otherwise maintains components of the multipoint lock 102. The housing 218 may extend within a hole or gap provided in a hinged panel. The housing 218 may include a main body portion 220 that is rectangular in shape with face bars 222, 224 of the housing 218 extend perpendicularly from the main body portion 220.

In certain instances, one of the components in the housing 218 of the multipoint lock 102 is an input mechanism 226. The input mechanism 226, which may be a thumb turn on one side and a key turn on the other, for example, is configured to rotate in response force by a user. As shown in FIGS. 2A-B, the input mechanism 226 is coupled to a gear mechanism 228. The input mechanism 226 is configured to transfer rotation, as input by the user, to the gear mechanism 228. The gear mechanism 228 rotates in response to rotation of the input mechanism 226, which may be turned or rotated between an unlocked and lock position of the multipoint lock 102. As noted above and as shown, the horizontally translating lock bolt 112 and two vertically translating bolts 114, 116 are in an extended state when in the locked position.

The gear mechanism 228 is pinned to lock bolt 112. In addition, the lock bolt 112 is plugged into the linkage 230. As a result, the gear mechanism 228 is (indirectly) coupled to a linkage 230. The linkage 230 may extend vertically within the housing 218 of the multipoint lock 102. The linkage 230 may collapse and expand in response to rotation of the gear mechanism 228. The linkage 230 is also joined, directly or indirectly, to the lock bolts 114, 116. End portions of the linkage 230 are connected to the vertically translating bolts 114, 116, while a pivot point of the linkage 230 is connected to the horizontally translating lock bolt 112 (e.g., as discussed in further detail with reference to FIG. 4).

Figure 3A:
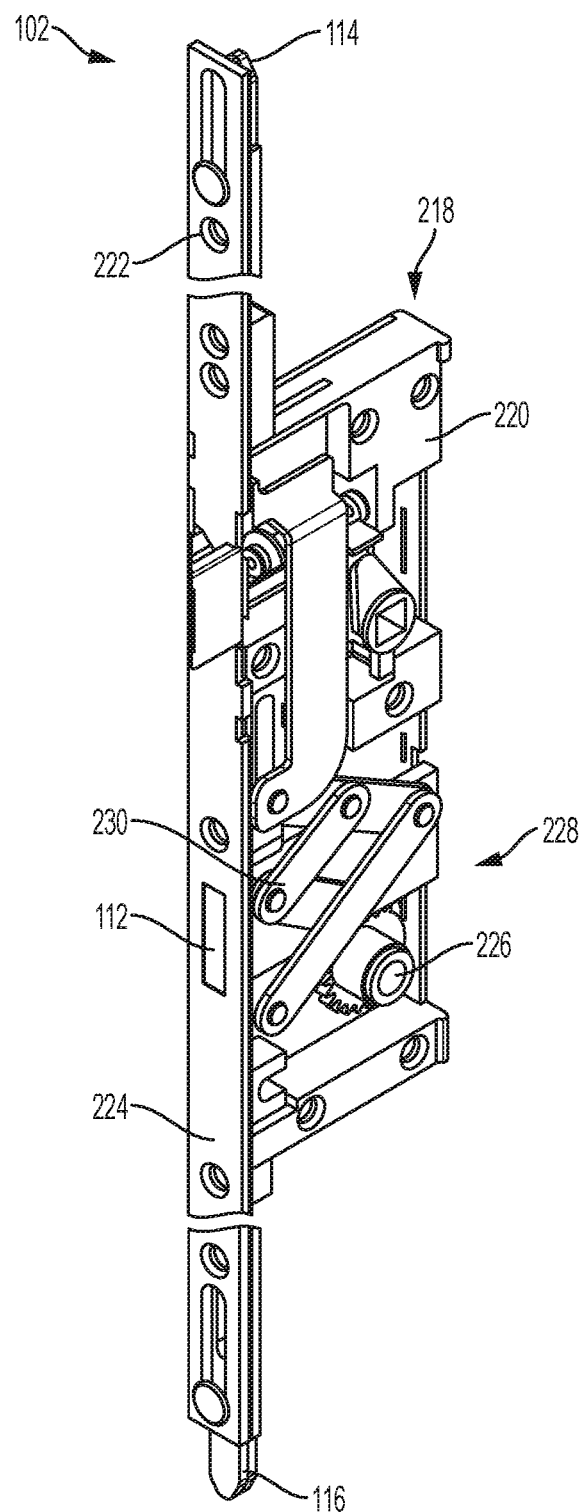
FIG. 3A is a first view of a multipoint lock in an unlocked position, according to some examples.
Figure 3B:
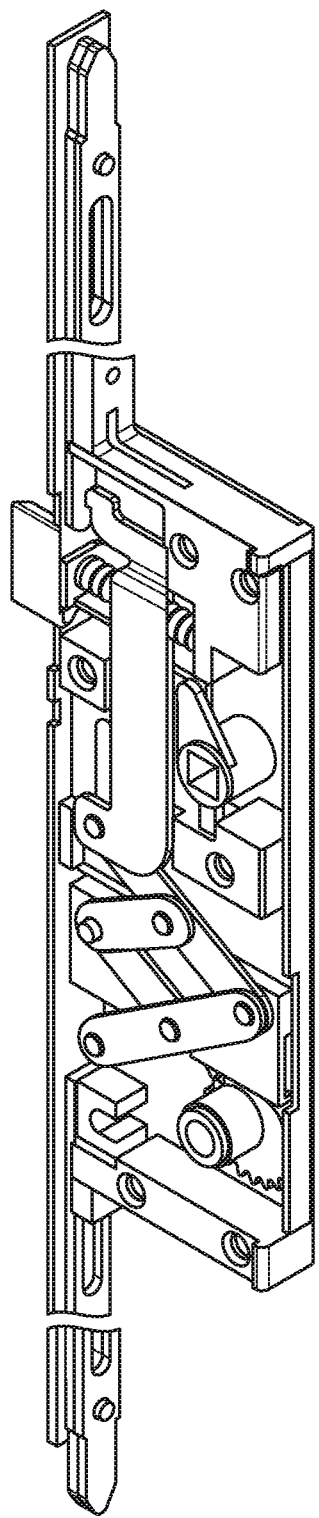
FIG. 3B is a second view of a multipoint lock, shown in FIG. 3A, in an unlocked position, according to some examples.

FIGS. 3A-B are first and second views of the multipoint lock 102 in an unlocked position, according to some examples. In comparison to the configuration of the multipoint lock 102 in FIGS. 2A-B, the input mechanism 226 has been rotated from the locked position to the unlocked position in the configuration shown in FIGS. 3A-B. Rotation of the input mechanism 226, as noted above, rotates the gear mechanism 228, coupled to the linkage 230 (by way of the gear mechanism 228 being pinned to lock bolt 112, and lock bolt 112 being attached or pinned to linkage 230), effect actuation of the linkage 230 to translate the lock bolts 112, 114, 116 into the housing 218 of the multipoint lock 102.

In certain instances, the linkage 230 is configured to collapse (e.g., in a scissors-action) in response to actuation of the input mechanism 226 from the locked position to the unlocked position and expand in response to actuation of the input mechanism 226 from the unlocked position to the locked position (e.g., as shown compared to the configuration of the multipoint lock 102 in FIGS. 2A-B and the configuration of the multipoint lock 102 in FIGS. 3A-B).

In addition, the gear mechanism 228 may include a changing gear ratio drive mechanism configured to actuate the linkage 230. The changing gear ratio drive of the gear mechanism 228 allows for a smooth operation of the multipoint lock 102, More specifically, the changing gear ratio drive of the gear mechanism 228 is configured to deliver a mechanical advantage for user force input. Initial force input by the user in turning the input mechanism 226 is low and allows the user to gain momentum and/or overcome static friction in the system. The changing gear ratio drive of the gear mechanism 228 is configured to increase force input by the user to the input mechanism 226 progressively when transitioning from the unlocked position to the locked position.

Figure 4:
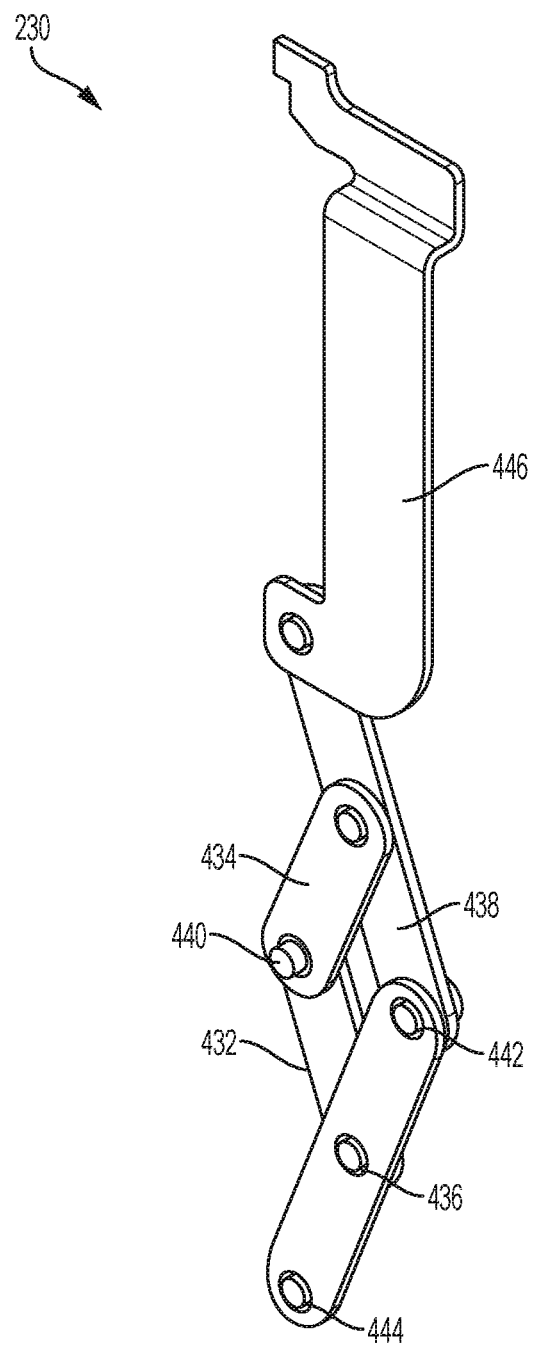
FIG. 4 is an illustration of a linkage for a multipoint lock, according to some examples.

FIG. 4 is an illustration of a linkage 230 for a multipoint lock, according to some examples. The linkage 230, as shown in FIGS. 2A-B and FIGS. 3A-B, may include multiple bars. More specifically, the linkage 230 includes four bars 432, 434, 436, 438, The bars 432, 434, 436, 438 actuate in a scissor-like manner to collapse and expand. The bars 432, 434, 436, 438, for example, collapse toward one another (e.g., to reduce the overall linkage width while increasing linkage height), and expand away from one another (e.g., to increase overall linkage width while decreasing linkage height) in response to rotation of the gear mechanism 228, as discussed above. In addition, the bars 432, 434, 436, 438 pivot at connection points 440, 442 between the bars 432, 434, 436, 438.

In certain instances, the linkage 230 may be connected to bolts 112, 114, 116 as discussed in further detail above. At connection point 442, an attachment mechanism couples together bar 436 and bar 438, the attachment mechanism may include additional depth to pin the linkage 230 to the horizontally translating lock bolt 112 shown in FIGS. 2A-B and FIGS. 3A-B. In this manner, the horizontally translating lock bolt 112 directly translates in response to collapsing and expanding movement of the linkage 230.

In addition, the linkage 230 may also be directly or indirectly connected to vertically translating bolts 114, 116. In certain instances, the linkage 230 may include at least one addition bar 446 that extends from the linkage 230 toward one of the vertically translating bolts 114, 116. Although FIG. 4 shows a single additional bar 446, another additional bar may extend from connection point 444 for the other of the vertically translating bolts 114, 116.

Figure 5:
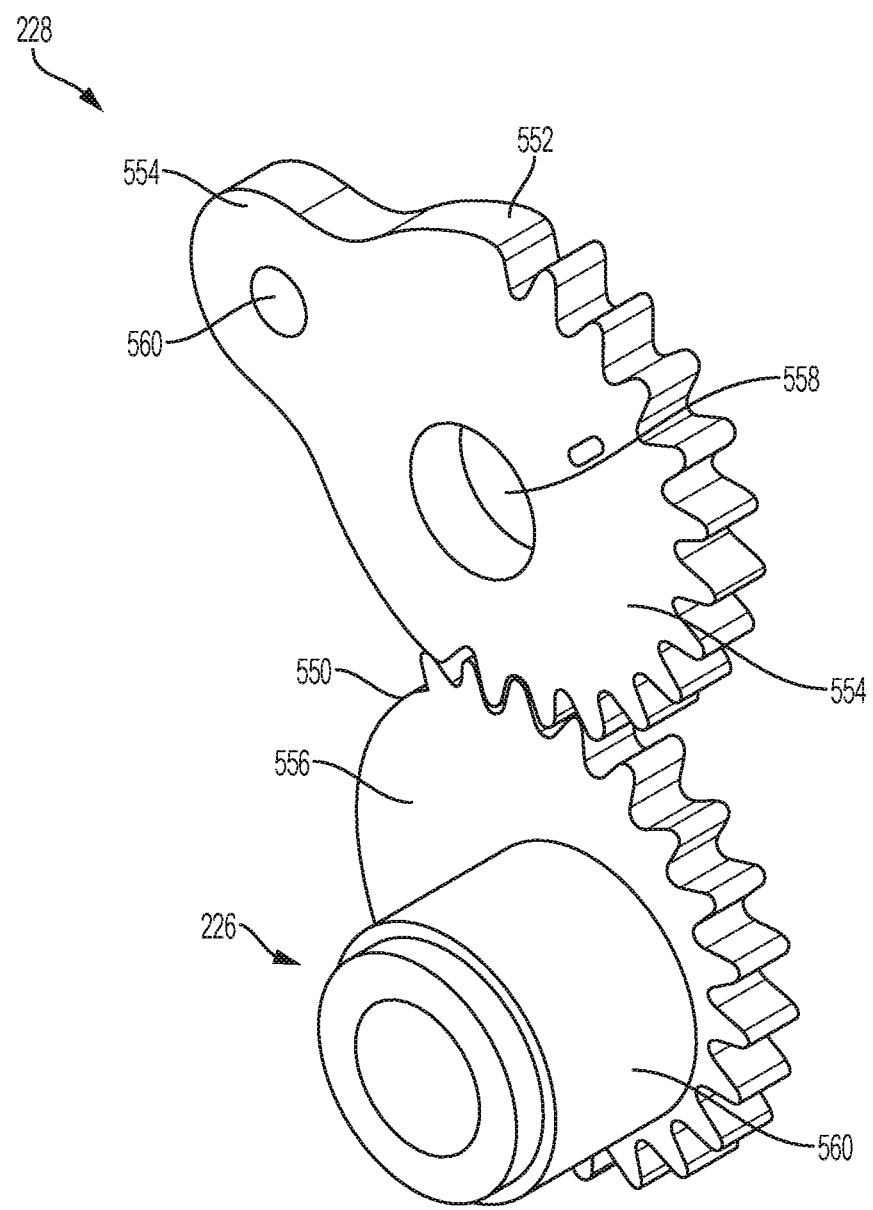
FIG. 5 is an illustration of a gear mechanism for a multipoint lock, according to some examples.

FIG. 5 is an illustration of a gear mechanism 228 for a multipoint lock, according to some examples. The gear mechanism 228 includes a first gear 550 and a second gear 552. As shown in FIG. 5, the first gear 550 is coupled to an input mechanism 226. In addition, the gear mechanism 228 can be an elliptical gear drive mechanism. Although two gears are shown, any number of gears (e.g., three, four, ten, or some other number) are contemplated depending upon application.

Regarding the elliptical gear drive mechanism of the gear mechanism 228, each of the first gear 550 and the second gear 552 are elliptical in shape. The first gear 550 and the second gear 552 include a major axis 554, 556 that is offset from a rotational center 558, 560 of the first gear 550 and the second gear 552. In this manner, the first gear 550 and the second gear 552 include a changing gear ratio drive configured to deliver a mechanical advantage for user force input. Initial force input by the user in turning the input mechanism 226 is low and allows the user to gain momentum and/or overcome static friction in the system. The changing gear ratio drive of the gear mechanism 228 is configured to increase force input by the user to the input mechanism 226 progressively when transitioning from the unlocked position to the locked position.

Teeth of the first gear 550 and the second gear 552, in certain instances, are arranged about half of a perimeter of the first gear 550 and the second gear 552. As a result, the first gear 550 and the second gear 552 can include 180 degrees of rotation. The 180 degrees of rotation may correspond to the amount of rotation of the input mechanism 226 between the unlocked position to the locked position.

The second gear 552 may be coupled to a linkage 230 by way of the lock bolt 112 as discussed in further detail above. The second gear 552 can include a hole or opening into which a pin or other attachment mechanism is inserted to couple the second gear 552 to the lock bolt 112. More specially, the second gear 552 can include a hole 560 through which the pin or other attachment mechanism is inserted to couple the second gear 552 to the lock bolt 112.

Figure 6A:
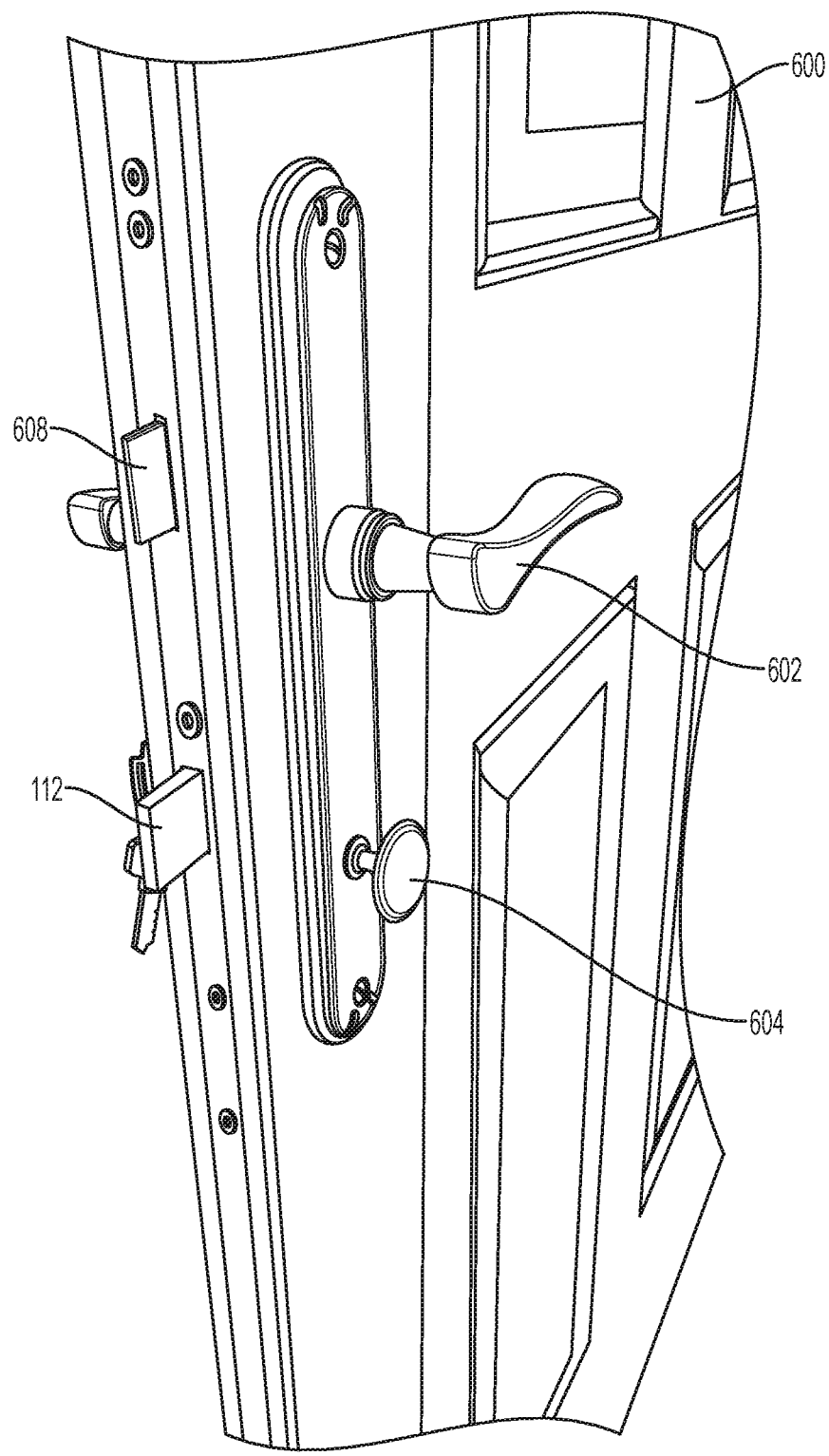
FIG. 6A is an illustration of a hinged panel and a multipoint lock viewed from a first side, according to some examples.
Figure 6B:
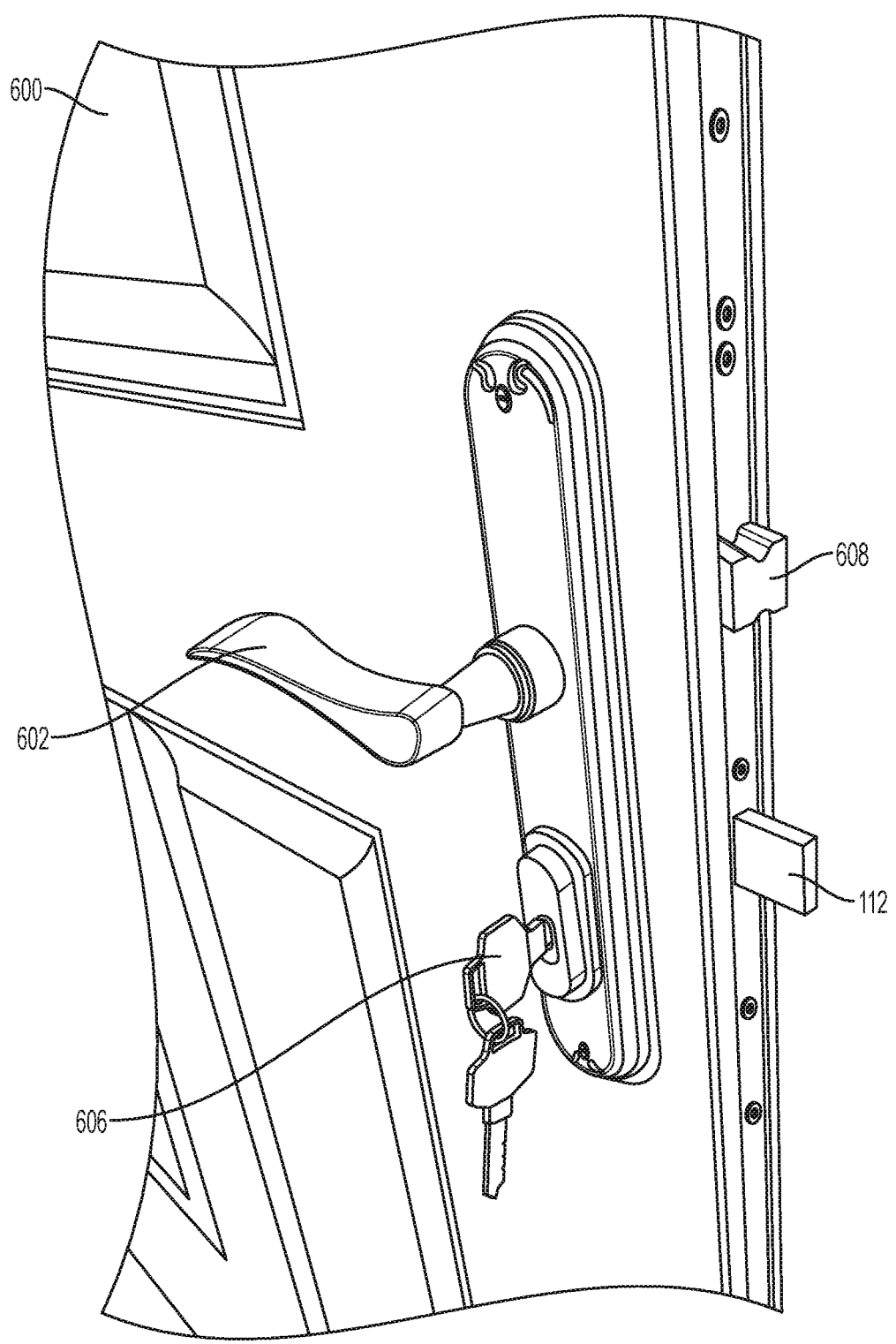
FIG. 6B is an illustration of the hinged panel and multipoint lock, shown in FIG. 6A, viewed from a second side, according to some examples.

FIG. 6A-B are illustrations of a hinged panel 600 and a multipoint lock 102 viewed from a first side and a second side, according to some examples. More specifically, the multipoint lock 102 is coupled or attached to the hinged panel 600. The multipoint lock 102 may interact with a second door component (such as a door jamb or a stationary door) that includes a strike plate(s) for each of the lock bolts of the multipoint lock 102.

The multipoint lock 102 includes a handle 602, present on each of the first side and the second side of the hinged panel 600. In addition, the multipoint lock 102 includes a thumb turn 604 on the first side of the hinged panel 600 and multipoint lock 102, and a key turn 606 on the second side of the hinged panel 600 and multipoint lock 102. Each of the thumb turn 604 and the key turn 606 are coupled to an input mechanism (e.g., as shown and discussed with reference to FIGS. 2-3). As noted above, the multipoint lock 102 includes a ratio drive mechanism for smooth and low force operation (as compared to other single actuation multipoint locks or traditional multipoint locks) in response to rotation of the thumb turn 604 or input key turn 606.

The multipoint lock 102 also includes a horizontally translating lock bolt 112, Although only the horizontally translating lock bolt 112 is shown, the multipoint lock 102 also includes at least one vertically translating lock bolt (e.g., as shown in FIGS. 1-3). As also shown in FIG. 6, the multipoint lock may include a latch 608 that is operable by turning the handle 602.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A multipoint lock comprising:
   a horizontally translating lock bolt;
   at least one vertical translating lock bolt;
   a linkage coupled to and configured to translate the horizontally translating lock bolt and the at least one vertical translating lock bolt;
   a gear mechanism configured to actuate the linkage and to effect translation of the horizontally translating lock bolt and the at least one vertical translating lock bolt; and
   an input mechanism configured to transfer rotation of the input mechanism to the gear mechanism and collapse and expand the linkage in a scissor-like manner in response to a user shifting the input mechanism between an unlocked position and a locked position to translate the horizontally translating lock bolt and the at least one vertical translating lock bolt.

2. The multipoint lock of claim 1, wherein the linkage is joined to the horizontally translating lock bolt and the at least one vertical translating lock bolt.

3. The multipoint lock of claim 2, wherein the linkage is configured to collapse in response to actuation of the input mechanism from the locked position to the unlocked position and expand in response to actuation of the input mechanism from the unlocked position to the locked position.

4. The multipoint lock of claim 1, wherein the gear mechanism is a changing gear ratio drive mechanism configured to actuate the linkage and to increase force input by the user to the input mechanism progressively when transitioning from the unlocked position to the locked position.

5. The multipoint lock of claim 1, wherein the gear mechanism is an elliptical gear drive mechanism having a first gear and a second gear.

6. The multipoint lock of claim 5, wherein the first gear is coupled to the input mechanism and the second gear is coupled to the horizontally translating lock bolt.

7. The multipoint lock of claim 6, wherein the second gear is configured to translate the horizontally translating lock bolt and effect actuation of the linkage to translate the at least one vertical translating lock bolt in response to rotation of the first gear by a user applying force to the input mechanism.

8. The multipoint lock of claim 5, wherein the elliptical gear mechanism is configured to increase force input by the user to the input mechanism progressively when transitioning from the unlocked position to the locked position.

9. The multipoint point lock of claim 1, wherein the input mechanism is a thumb turn or a key turn.

10. A fenestration system comprising:
    a hinged panel; and
    a multipoint lock arranged within the hinged panel, the multipoint lock including:
      a first translating lock bolt,
      a second translating lock bolt,
      a linkage coupled to and configured to translate the first translating lock bolt and the second translating lock bolt, an elliptical gear mechanism configured to translate rotation of the gear mechanism to the linkage and actuate the first translating lock bolt and the second translating lock bolt, and an input mechanism configured to transfer rotation of the input mechanism to the elliptical gear mechanism in response to a user shifting the input mechanism between an unlocked position and a locked position with the elliptical gear mechanism being configured to increase force input by the user to the input mechanism progressively when transitioning from the unlocked position to the locked position and collapse and expand the linkage in a scissor-like manner to translate the first translating bolt and the second translating bolt.

11. The system of claim 10, wherein the first translating lock bolt is a horizontally translating lock bolt and the second translating lock bolt is a vertical translating lock bolt and wherein the elliptical gear mechanism includes a first gear and a second gear, and the first gear is coupled to the input mechanism and the second gear is coupled to the horizontally translating lock bolt.

12. The system of claim 11, wherein the second gear is configured to translate the horizontally translating lock bolt and effect actuation of the linkage to translate the vertical translating lock bolt in response to rotation of the first gear by a user applying force to the input mechanism.

13. The system of claim 12, wherein the second gear is coupled to the horizontally translating lock bolt by an attachment mechanism.

14. The system of claim 10, wherein the linkage is configured to collapse in response to actuation of the input mechanism from the locked position to the unlocked position and expand in response to actuation of the input mechanism from the unlocked position to the locked position.

15. The system of claim 10, wherein the first translating lock bolt is a horizontally translating lock bolt and the second translating lock bolt is a vertical translating lock bolt.

16. A method of operating a multipoint lock, the method comprising:
rotating an input mechanism between an unlocked and a locked position;
transferring rotation of the input mechanism to a gear mechanism;
actuating a linkage in response to rotating the gear mechanism to collapse and expand the linkage in a scissor-like manner; and
translating a horizontally translating lock bolt and at least one vertical translating lock bolt by actuating the linkage.

17. The method of claim 16, wherein the gear mechanism is an elliptical gear mechanism and is configured to increase force input by the user to the input mechanism progressively when transitioning from the unlocked position to the locked position.

18. The method of claim 17, wherein the linkage is configured to collapse in response to actuation of the input mechanism from the locked position to the unlocked position and expand in response to actuation of the input mechanism from the unlocked position to the locked position.

19. The method of claim 17, wherein the gear mechanism includes a first gear and a second gear, and the first gear is coupled to the input mechanism and the second gear is coupled to the linkage.

\* \* \* \* \*